United States Patent [19]
Takemori

[11] Patent Number: 4,967,093
[45] Date of Patent: Oct. 30, 1990

[54] DEFORMATION MEASURING METHOD AND DEVICE USING CROSS-CORRELATION FUNCTION BETWEEN SPECKLE PATTERNS WITH REFERENCE DATA RENEWAL

[75] Inventor: Tamiki Takemori, Shizuoka, Japan

[73] Assignee: Hamamatsu Photonics Kabushiki Kaisha, Shizuoka, Japan

[21] Appl. No.: 367,659

[22] Filed: Jun. 19, 1989

[30] Foreign Application Priority Data

Jun. 22, 1988 [JP] Japan .................................. 63-154298
Jul. 18, 1988 [JP] Japan .................................. 63-178352

[51] Int. Cl.⁵ ............................................. G01V 9/04
[52] U.S. Cl. ..................................... 250/560; 356/376
[58] Field of Search ................ 356/376, 371; 250/560, 250/561; 364/819, 820

[56] References Cited

U.S. PATENT DOCUMENTS

| | | | |
|---|---|---|---|
| 3,617,625 | 11/1971 | Redpath | 364/820 |
| 4,539,651 | 9/1985 | Ludman | 364/819 |
| 4,636,069 | 1/1987 | Balasubramanian | 356/376 |
| 4,641,972 | 2/1987 | Halioua et al. | 356/376 |
| 4,657,393 | 4/1987 | Stern | 356/376 |
| 4,678,920 | 7/1987 | Iadipaolo et al. | 250/560 |
| 4,802,759 | 2/1989 | Matsumoto et al. | 356/376 |

FOREIGN PATENT DOCUMENTS

52-963 12/1984 Japan .

OTHER PUBLICATIONS

"Laser Science Research," No. 6, pp. 152–154 (1984).
"Latest Precision Measurement Technology," Jul. 1, 1987, pp. 241–244.

Primary Examiner—David C. Nelms
Assistant Examiner—Que Tan Le
Attorney, Agent, or Firm—Finnegan, Henderson, Farabow, Garrett, and Dunner

[57] ABSTRACT

In a deformation measuring method and device in which an object is irradiated with a laser beam before and after deformation of the object to obtain speckle patterns, the speckle patterns thus obtained are photoelectrically converted into electrical signals, and the cross-correlation function between the speckle patterns is calculated using the electrical signals to obtain displacement of the speckle pattern on the basis of the shift of position of the extreme value of the mutual-correlation function and to determine the amount of deformation of the object from the displacement of the speckle pattern, (1) the reference speckle pattern data for calculation of the cross-correlation function is renewed when the extreme value of the cross-correlation function is lower in level than a predetermined value or when the position of the extreme value is out of a predetermined range, or (2) the reference speckle pattern data is renewed when the extreme value of the cross-correlation function is lower in level than a predetermined value and a calculation range for calculating the cross-correlation function is shifted when the position of the extreme value is out of a predetermined range.

10 Claims, 7 Drawing Sheets

FIG. 3(A) BEFORE DEFORMATION / AFTER DEFORMATION

FIG. 3(B) SELF-CORRELATION WAVEFORM

FIG. 3(C) MUTUAL-CORRELATION WAVEFORM

DEFORMATION MEASURING METHOD AND DEVICE USING CROSS-CORRELATION FUNCTION BETWEEN SPECKLE PATTERNS WITH REFERENCE DATA RENEWAL

BACKGROUND OF THE INVENTION

This invention relates to a deformation measuring method and device, and more particularly to an improvement of deformation measuring method and device in which a part of the surface of an object is irradiated with a laser beam before and after being deformed, to obtain speckle patterns. The amount of deformation of the object is determined on the basis of the cross-correlation function between the speckle patterns.

A speckle pattern is formed by interference of diffusion lights which are reflected from a rough surface of an object when a laser beam is applied to the surface. When the surface is displaced or deformed, the speckle pattern is displaced while gradually deformed. In this connection, a "speckle correlation method" has been proposed, in the art in which a speckle pattern is photoelectrically scanned and the speckle displacement is obtained from the correlative peak positions of the signals thus obtained, and the relations between the speckle displacement and the displacement (or deformation) of the surface are utilized to measure the minute deformation of the object due to translation, rotation and distortion or the like. This method is disclosed in detail in Japanese Patent Publication No. 52963/1984; "Laser Science Research" No. 6, pp 152–154 (1984) and "Latest Precision Measurement Technology" pp 241–244, on July 1, 1987.

Figure 1:
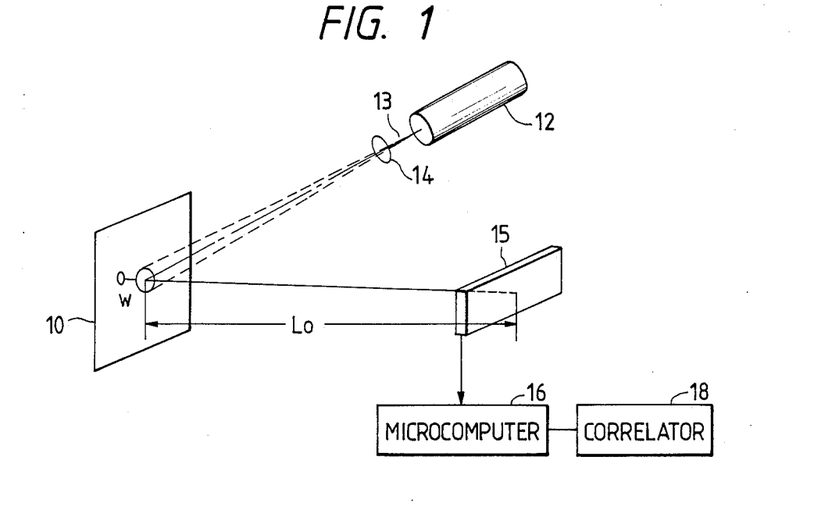
FIG. 1 is a perspective view for explaining the principle of a conventional speckle correlation method.

Of the speckle correlation methods, the most practical method uses a one-dimensional image sensor 15 and a micro-computer 16 as shown in FIG. 1. By this method, a parallel movement of 1 $\mu$m or more and a rotation of the order of $10^{-5}$ rad can be measured.

In the device as shown in FIG. 1, a laser beam about 1 mm in diameter which is generated by a laser source 12 is applied to a measuring point on an object, through a magnifying lens 14 if necessary, and the one-dimensional image sensor 15 is disposed in the propagating passage of the light beam reflected from the measuring point. In this case, the beam diameter W on the object 10 and the distance Lo between the object 10 and the image sensor 15 are adjusted so that an average diameter of the speckle pattern is approximately $\lambda Lo/W$ ($\lambda$: wavelength of the laser beam) on the sensor 15 is larger than the pitch (10 to 20 $\mu$m) of the sensor. In addition, the axis of the one-dimensional image sensor 15 is adjusted so as to be coincided with the direction of displacement of the speckle pattern which is determined by the optical system and the kind of displacement (the direction of parallel movement, rotation or distortion) of the object.

The output of the one-dimensional image sensor 15 is subjected to A-D (analog-to-digital) conversion and applied to a micro-computer 16. A correlation unit 18 calculates a cross-correlation function between the outputs of the micro-computer which correspond to the speckle patterns before and after the deformation of the object, and the speckle displacement is obtained from the peak positions of the correlation function substantially in real time. In this connection, in order to reduce the time required for calculation of the cross-correlation function, a method of calculating a "characteristic correlation" has been proposed in the art. In this method, the output signals of the one-dimensional image sensor 15 are binary-coded with respect of the average thereof. The speckle pattern thus obtained has high contrast, so that the peak position is coincided with that of the ordinary cross-correlation function at all times. Accordingly, the speckle displacement can be detected from the extreme position of the cross-correlation function.

In the conventional speckle correlation method, the cross-correlation function is obtained as follows: The speckle pattern provided by a scanning operation before the deformation of the object is used as a fixed reference speckle pattern (data) and the speckle pattern provided by a scanning operation while the object is being deformed is utilized as a comparison speckle pattern (data). Those data are compared with each other to obtain the cross-correlation function therebetween. Alternatively, the speckle pattern provided by a scanning operation while the object is being deformed is employed as a comparison data, but the data obtained by the preceding scanning operation, which is carried out immediately before the present scanning operation for the comparison data, is used as a reference data. That is, the cross-correlation function is obtained while the reference data is renewed every time.

In the former method adopting the fixed reference data, the speckle pattern to be compared is largely changed with the deformation of the object in comparison with the reference speckle pattern, and therefore the extreme value of the cross-correlation function becomes lower than the unrelated peak values around it, as a result of which it is impossible to obtain the position of the extreme value correctly, and the range of measurement is limited.

On the other hand, in the latter method adapting the reference data to be renewed every time, in the case where a speckle pattern is displaced at a distance less than half of the pitch interval of the one-dimensional image sensor 15 between two successive scanning operations (the present and preceding scanning operations), the reference data is identical to the comparison data, so that the position of the extreme value is not moved and the displacement of the object is disregarded. Since this error occurs every scanning operation, the low speed displacement of the speckle pattern cannot be detected particularly when the displacement between two successive scanning operations is less than half of the pitch interval of the image sensor.

SUMMARY OF THE INVENTION

An object of this invention is to eliminate the above-described difficulties accompanying a conventional speckle correlation method.

More specifically, an object of the invention is to provide a deformation measuring method which is improved in the accuracy of measurement by widening the range of measurement of displacement with no errors.

Another object of the invention is to provide a deformation measuring method which is improved also in the accuracy of measurement by minimizing the error in measurement of the displacement of an object in the case where the speckle pattern is less changed.

Still another object of the invention is to provide a deformation measuring device to which the deformation measuring method can be applied.

The foregoing objects of the invention have been achieved by the provision of deformation measuring method and device in which a part of the surface of an object is irradiated with a laser beam before and after being deformed, thereby obtaining speckle patterns before and after deformation of the object. The speckle patterns thus obtained are subjected to photo-electric conversion to provide electrical signals, and the cross-correlation function between the electrical signals is calculated, so that the amount of deformation of the object is determined from the amount of displacement of the speckle pattern which is obtained as the position of the extreme value of the cross-correlation function. According to a first aspect of this invention, a reference speckle pattern for mutual correlation is renewed, when the extreme value of the cross-correlation function becomes lower than a predetermined value, or when the position of the extreme value comes out of a predetermined range.

According to another aspect of this invention, when the extreme value of the cross-correlation function becomes lower than a predetermined value, a reference pattern for the cross-correlation function is renewed, and when displacement of the position of the extreme value comes out of a predetermined range, a calculation range for the cross-correlation function is changed.

BRIEF DESCRIPTION OF THE DRAWINGS

FIGS: 3(A), 3(B) and 3(C) are diagrams showing the output waveform, auto-correlation waveform and mutual-correlation waveform of a one-dimensional image sensor, respectively.

DETAILED DESCRIPTION OF THE INVENTION

Preferred embodiments of the invention will be described hereinunder with reference to the accompanying drawings.

First, the principle of measurement in a deformation measurement method according to the invention will be described with reference to FIG. 2.

Figure 2:
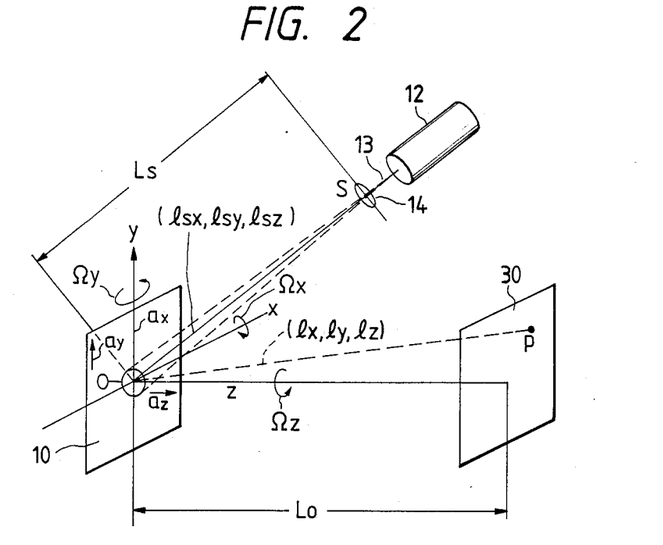
FIG. 2 is also a perspective view for explaining the principle of the conventional speckle correlation method.

As shown in FIG. 2, a laser beam 13 outputted by a laser source 12 is applied to a measuring region O of an object 10, through a magnifying lens 14 if necessary, and the resultant speckle pattern is observed on an observation plane 30. In this case, it is assumed that the coordinate axes on the object's surface are represented by x, y and z; the distance OS between the divergence point of the laser beam 13 and the measuring region 0, Ls (OS Ls); components representing the direction from the divergence point to the center of the region 0, lsx, lsy and lsz; the distance between the object's surface, and the observation plane 30, Lo; components representing the direction from the center of the region 0 to an observation point P, lx, ly and lz; and the components of translation, rotation and distortion of the object 10 at the region irradiated by the laser beam 13, (ax, ay, az), ($\Omega$x, $\Omega$y, $\Omega$z) and ($\epsilon$xx, $\epsilon$yx, $\epsilon$yy), respectively.

Speckle patterns are formed at the observation point P before and after deformation of the object. The cross-correlation function $C(\bar{x},\bar{y})$ between the intensity distributions $I_1(x,y)$ and $I_2(x,y)$ of the speckle patterns thus formed is as follows:

$$C(\bar{x},\bar{y}) = <I_1(x,y) \times I_2(x+\bar{x}Y+\bar{y}) \quad (1)$$

where < > means a set average.

Calculating equation (1), it can be understood that $C(\bar{x},\bar{y})$ has a maximum value with $\bar{x}=Ax$ and $\bar{y}=Ay$, where Ax and Ay are represented by the following equations (2) and (3) and physically correspond to the amount of displacement of the speckle pattern caused by the deformation of the object:

$$\begin{aligned}
Ax = &-ax[(Lo/Ls)(lsx^2 - 1) + lx^2 - 1] \\
&-ay[(Lo/Ls) \, lsx \, lsy + lx \, ly] \\
&-az[(Lo/Ls) \, lsx \, lsz + lx \, lz] - Lo[-\Omega z(lsy + ly) \\
&-\Omega y(lsz + lz) + \epsilon xx(lsx + lx) + \epsilon xy(lsy + ly)]
\end{aligned} \quad (2)$$

$$\begin{aligned}
Ay = &-ax[(Lo/Ls)(lsy \, lsx + ly \, lx] \\
&-ay[(Lo/Ls)(lsy^2 - 1) + ly^2 - 1] \\
&-az[(Lo/Ls) \, lsy \, lsz + lx \, lz] - Lo[-\Omega z(lsx + lx) \\
&-\Omega x(lsz + lz) + \epsilon yy(lsy + ly) + \epsilon xy(lsx + lx)]
\end{aligned} \quad (3)$$

Figure 3A:
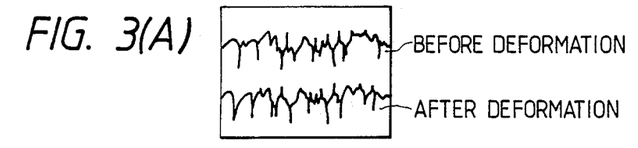
Figure 3B:
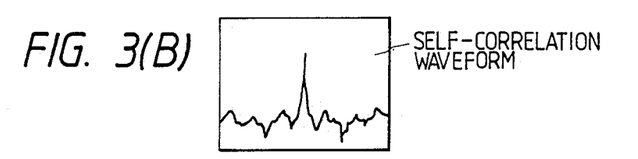
Figure 3C:
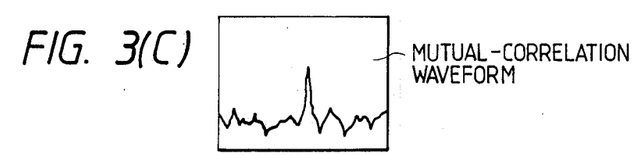

Accordingly, when the amount of displacement of the speckle pattern (Ax and Ay) are observed with one-dimensional image sensor disposed at the observation plane 30, the output waveform of the image sensor changes as shown in FIG. 3A after and before deformation of the object, the auto-correlation waveform is as shown in FIG. 3(B), and the cross-correlation waveform is as shown in FIG. 3(C).

In measuring the deformation of an object with the above-described device, unlike the conventional method in which the reference data (speckle pattern) is fixed or renewed every time to obtain the cross-correlation function, the reference data (speckle pattern) is renewed in this invention only when the extreme value of the cross-correlation function is lower than a predetermined value or the position of the extreme value comes out of a predetermined range. Thus, when the speckle pattern is displaced greatly with the deformation of the object, the reference pattern is renewed and therefore the range of measurement is not limited. In contrast, in the case where the deformation of the object is small and therefore the position of the extreme value is within the predetermined range, according to the method of the invention the reference speckle pattern is fixed, so that the displacement at a low speed can be detected unlike the conventional method in which the reference data is renewed every time. Accordingly, the accuracy of measurement can be increased while the range of displacement measurement is increased with no errors.

Figure 4:
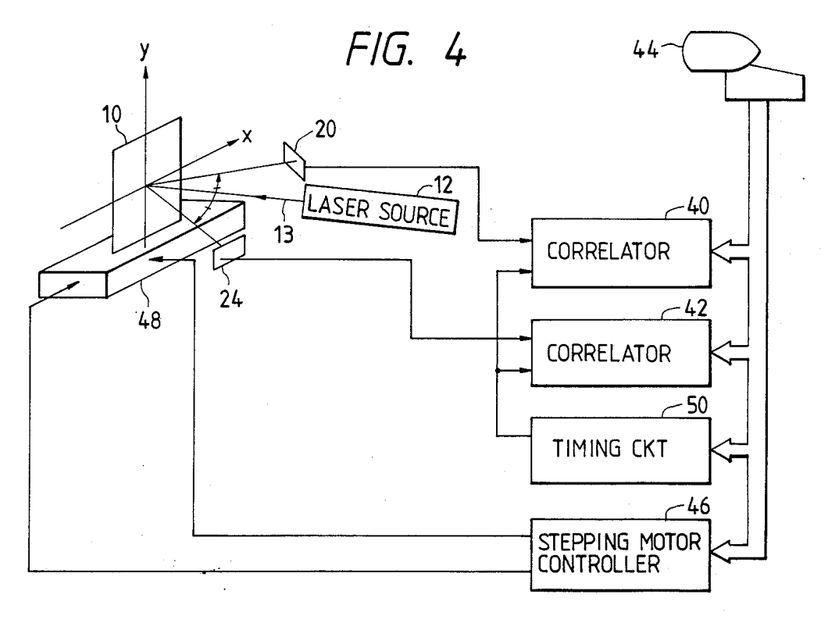
FIG. 4 is a perspective view showing the arrangement of deformation measuring device used in a deformation measuring method according to the invention.
Figure 5:
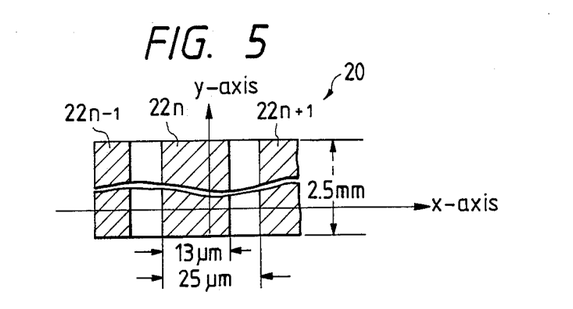
FIG. 5 is a front view of a photosensitive element array in the deformation measuring device.

FIG. 4 shows the arrangement of one example of a deformation measuring device to which the deformation measuring method according to the invention is applied. The device, as shown in FIG. 4, comprises: a laser source 12 for applying a laser beam 13 to the surface of an object 10 to be measured to form a speckle pattern. In order to subject the speckle pattern to photoelectric conversion, two photosensitive element arrays 20 and 24 are arranged with an angle therebetween. FIG. 5 shows that each of the photosensitive element arrays has a strip or comb structure in which each of the photosensitive elements (---, $22_{n-1}$, $22_n$, $22_{n+1}$, ---) constituting a photosensitive element array has a rectangular form with a large ratio of a long side to a short side (for example, a short side of 13 um and a long side of 2.5 mm), which are arranged at intervals of 25 $\mu$m in a strip form.

The speckle patterns, after being subjected to photoelectric conversion by the photosensitive element arrays 20 and 24, are applied to correlators 40 and 42 according to the invention as shown in FIG. 4, in each of which the change in position of the extreme value of the cross-correlation function before and after the speckle pattern displacement is detected.

The correlators 40 and 42 are identical in construction, and therefore only the correlator 40 will be described with reference to FIG. 6.

Figure 6:
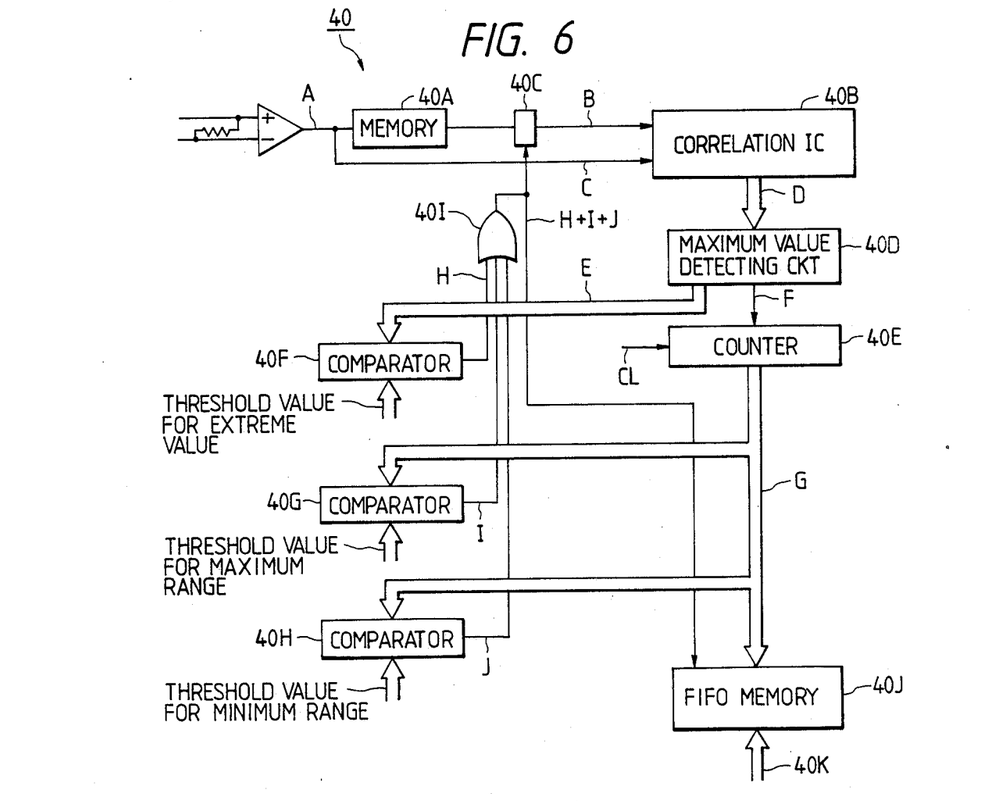
FIG. 6 is a block diagram showing the arrangement of a correlator employed in a first example of the method of the invention.

The correlator 40 as shown in FIG. 6, comprises: a memory 40A for temporarily storing the preceding speckle pattern (one-frame) data of the binary-coded (A/D-converted) electrical signal A which is obtained by the preceding scanning operation through the photosensitive element array 20 as shown in FIG. 4 (in the case of the correlator 42, through the photosensitive element array 24 as shown in FIG. 4); correlation IC 40B (for instance TDC1023 manufactured by TRW Company) for receiving a reference speckle pattern data B from the memory 40A and a comparison speckle pattern data C from the photosensitive element array 20 or 24 (as shown in FIG. 4) to output the correlation value D between the reference and comparison data B and C; a gate 40C for renewing the reference speckle pattern data B; a maximum value detecting circuit 40D for outputting the extreme value E of the correlation values D provided every shift clock pulse CL, and its timing output F; a counter 40E for receiving the timing output F and the shift clock pulse CL to output a signal G representing the position of the extreme value (in this case, maximum value); and a comparison circuit 40F for comparing the extreme value E outputted from the maximum value detecting circuit 40D with a predetermined threshold value, to output a reference pattern exchange signal H when the extreme value E is less than the threshold value. The correlator 40 further comprises: a comparison circuit 40G for comparing the shift of the position G of the extreme value outputted from the counter 40E with a predetermined maximum threshold value for the maximum range, and outputting a reference pattern exchange signal I when the position of the extreme value exceeds the maximum threshold value; a comparison circuit 40H for comparing the shift of the position G of the extreme value with a predetermined minimum threshold value (for the minimum range), and outputting a reference pattern exchange signal J when the position G of the extreme value is less than the minimum threshold value; an Or gate 40I for performing add operation between the reference pattern exchange signals H, I and J and outputting the resultant to the gate 40C and an FIFO (first-in first-out) memory 40J (described later); and the FIFO memory 40J for temporarily storing position G of the extreme value outputted from the counter 40E and the reference pattern exchange signal H+I+J and applying them to a CPU bus 40K.

Figure 7:
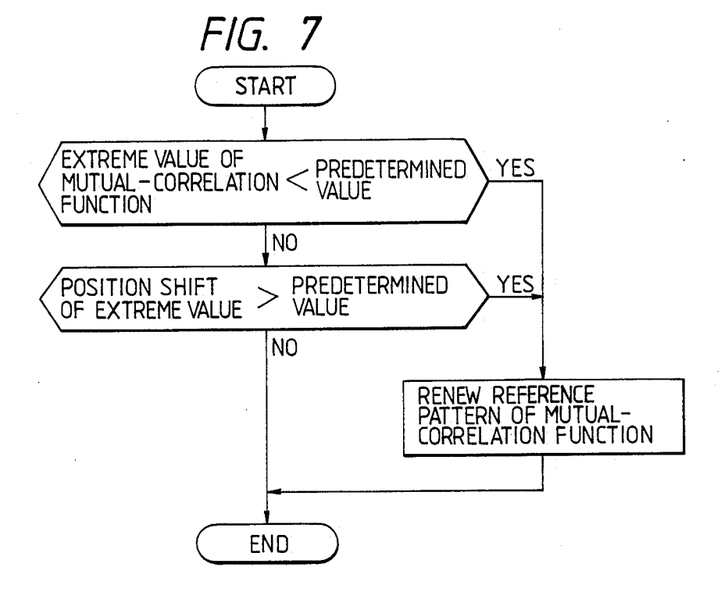
FIG. 7 is a flow chart for explaining the first embodiment of the method of the invention.

According to a flow chart shown in FIG. 7, when the extreme value is lower in level than the threshold value therefor or the position G of the extreme value is out of the predetermined range, the renewing operation of the reference pattern is automatically carried out.

The shift of the position of the extreme values detected by the correlators 40 and 42 shown in FIG. 4 are applied to and processed by the computer 44, in which the amount of deformation of the object is calculated from the amount of displacement of the speckle pattern.

The computer 44 applies an instruction to the stepping motor controller 46 to move along the x-axis the linear stage 48 on which the object 10 is placed, so that the speckle pattern is displaced along the x-axis, and at the same time applies necessary timing signals to the correlators 40 and 42.

Figure 8:
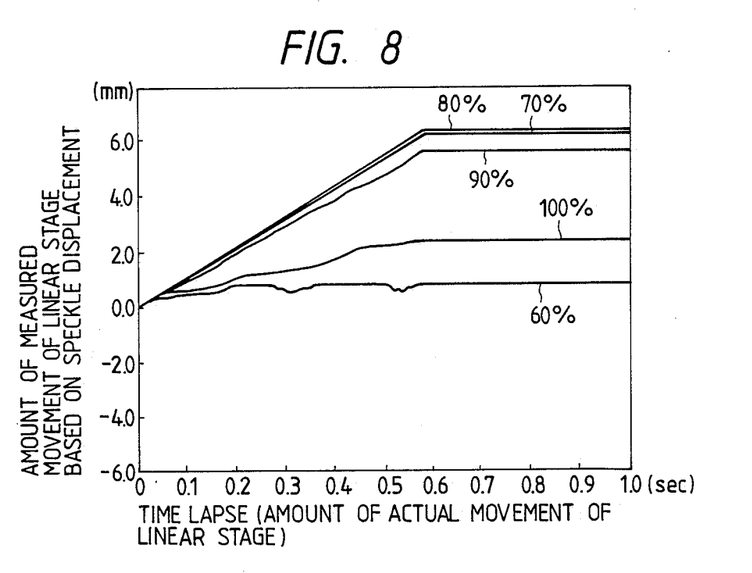
FIG. 8 is a graph showing the relationships between amount of movement of a linear stage and measured values thereof in the case of changing a threshold value for the extreme value for the extreme value of the mutual-correlation function in the first embodiment of the method of the invention.

FIG. 8 is a graph showing the relation between the measured and actual data with the threshold value of the extreme value E set to 100%, 90%, 80%, 70% and 60% in the case where the linear stage 48, shown in FIG. 4 is moved 6 mm along the x-axis. In the measurement using the threshold value of 100%, the reference speckle pattern is renewed every time. This is identical to the conventional measurement in which a speckle pattern of the just preceding frame is employed as the reference pattern. In the measurement using the threshold value of 60%, the reference pattern is not renewed because the threshold value is low. This is substantially identical to the conventional measurement in which the reference pattern is fixed.

On the other hand, it is apparent from FIG. 8, in the case where the reference speckle pattern is renewed with the threshold values ranged from 70% to 90%, the measured displacement of the linear stage which is obtained from the displacement of the speckle pattern corresponds substantially to the actual movement of the linear stage 48 shown in FIG. 4.

In the first embodiment of the method for obtaining the cross-correlation function as described above, when the deformation of the object is made in the direction intersecting to the observing plane of the object, that is, the same position of the object is irradiated by the laser beam before and after deformation, the speckle pattern is moved over the image sensor with small displacement. In this case, with the extreme value of the cross-correlation function less decreased, the position of the extreme value is moved. Accordingly, the number of times at which the position of the extreme value comes out of the predetermined range is increased and therefore the number of exchanging the reference pattern of the cross-correlation pattern is greatly increased. An exchange of the reference pattern causes an error of the half of the pitch interval of the photosensitive element in the image sensor at maximum, so that the total error corresponding to the product of the pitch interval and the number of exchanging the reference pattern may be caused.

In order to overcome this difficulty, the following second embodiment is employed: When, in obtaining the cross-correlation function, the extreme value of the cross-correlation function is smaller than a predetermined value, the reference pattern of the mutual-correlation function is renewed; and when the position of the extreme value comes out of the predetermined range, the reference pattern of the cross-correlation function is not renewed, and instead thereof the range of calculation for cross-correlation function is changed (or shifted). Hence, when the same part of the object is irradiated by the laser beam before and after deformation of the object as in the case where the object is displaced out of the observing plane of the object, the frequency of exchanging the reference pattern is decreased and therefore the measurement error can be decreased. Accordingly, in measurement of the displacement of an object when the speckle pattern is less changed, the error is minimized and the accuracy of measurement is increased.

The deformation measuring device to which the second embodiment of this invention is applied has the same fundamental construction as that in the first embodiment shown in FIG. 4; however, it should be noted that the correlators of the first and second embodiments are greatly different from each other.

Figure 9:
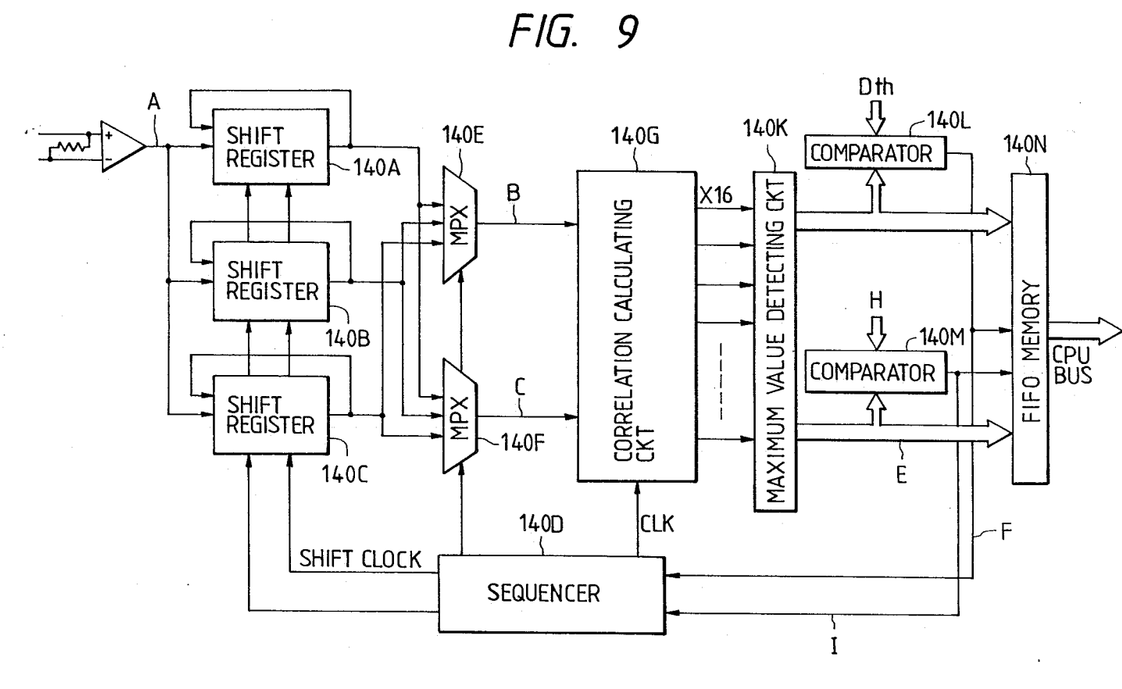
FIG. 9 is a block diagram showing the arrangement of a correlator employed in a second embodiment of the deformation measuring method according to the invention.

The correlator 40 (or 42) of the second embodiment as shown in FIG. 9, comprises three shift registers (140A, 140B and 140C) for holding reference pattern data B for the binary-coded electrical signal A of the speckle pattern provided by the photosensitive element array 20 (or 24 shown in FIG. 4), for holding comparison data C for calculation of the correlation function with the reference pattern data B, and for holding the binary-coded electrical signal A provided by the photosensitive element array 20 (or 24) during calculation of the correlation function.

The roles of three shift registers are dynamically swapped for one another by means of a sequencer 140D; that is, the shift registers are used alternately as a reference pattern data shift register, a comparison data shift register, and a buffer shift register.

The shift register selected for holding the reference pattern data is connected in ring mode by the sequencer 140D, so that the reference pattern data is held for the next correlation calculation.

The sequencer 140D selects the input of a multiplexer (MPX) 140E to apply one of the outputs of the three shift registers, as the reference pattern data B, to a correlation calculation circuit 140G; and further it selects the input of the other multiplexer (MPX) 140F to apply another of the outputs of the three shift registers, as the comparison data C, to the circuit 140G.

Figure 10:
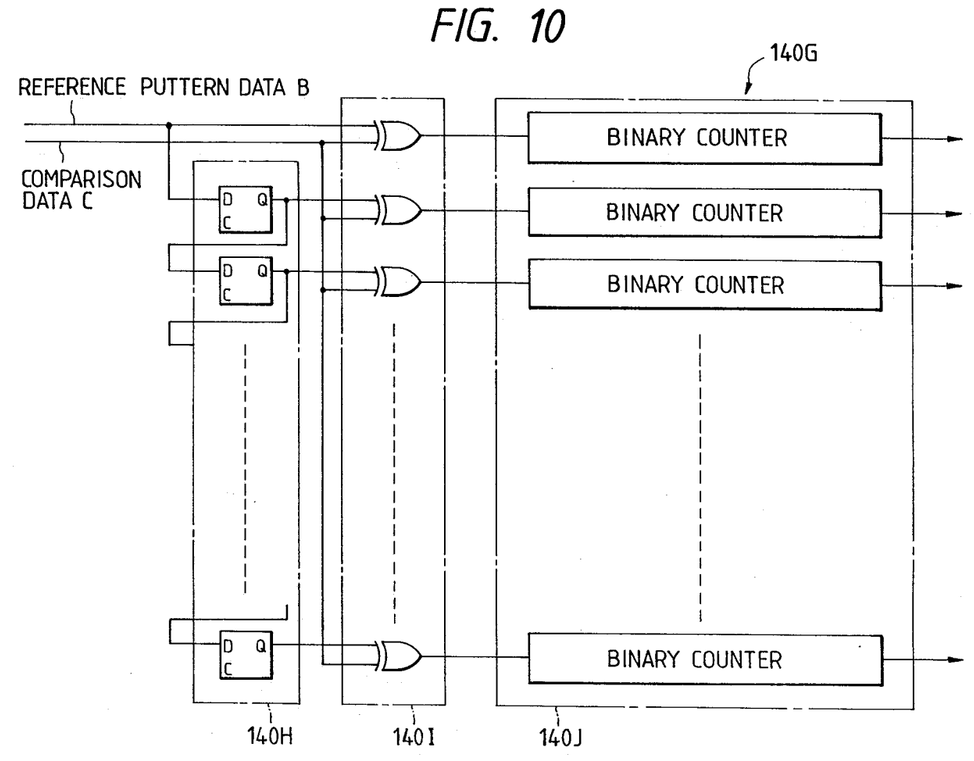
FIG. 10 is a block diagram showing a correlation calculation circuit included in the correlator as shown in FIG. 9.

The correlation calculation circuit 140G is shown in detail in FIG. 10. The circuit 140G comprises: a shift register 140H; an array 140I of, for example, 16 EX-CLUSIVE OR circuits; and an array 140J of 16 binary counters, so that sixteen points of the correlation function can be simultaneously calculated.

A maximum value detecting circuit 140K shown in FIG. 9 receives the values of sixteen points of the correlation function which has been calculated by the correlation calculation circuit 140G, to detect the extreme value of the correlation function and its position E, and outputs them to comparison circuits 140L, 140M and an FIFO (first-in first-out) memory 140N.

In the comparison circuit 140L, the extreme value D provided by the maximum value detecting circuit 140K is compared with a predetermined threshold value Dth. When the extreme value D is lower then the threshold value Dth, the comparison circuit 140L applies a reference pattern exchange signal F to the sequencer 140D and the FIFO memory 140N.

On the other hand, in the comparison circuit 140M, the position E of the extreme value provided by the maximum value detecting circuit 140K is compared with a predetermined correlation calculation range threshold value H. According to the result of the comparison, the comparison circuit 140M applies a correlation calculation range shift signal I to the sequencer 140D and the FIFO memory 140N to shift the correlation calculation range to the positive side or to the negative side.

In response to the reference pattern exchange signal F, the sequencer 140D causes the roles of the shift registers 140A, 140B and 140C to be exchanged for one another, and changes the selected input terminals of the multiplexers 140E and 140F. In addition, in response to the correlation calculation range shift signal I, the sequencer 140D applies a shift clock pulse to the reference pattern data shift register to shift the correlation calculation range.

Figure 11:
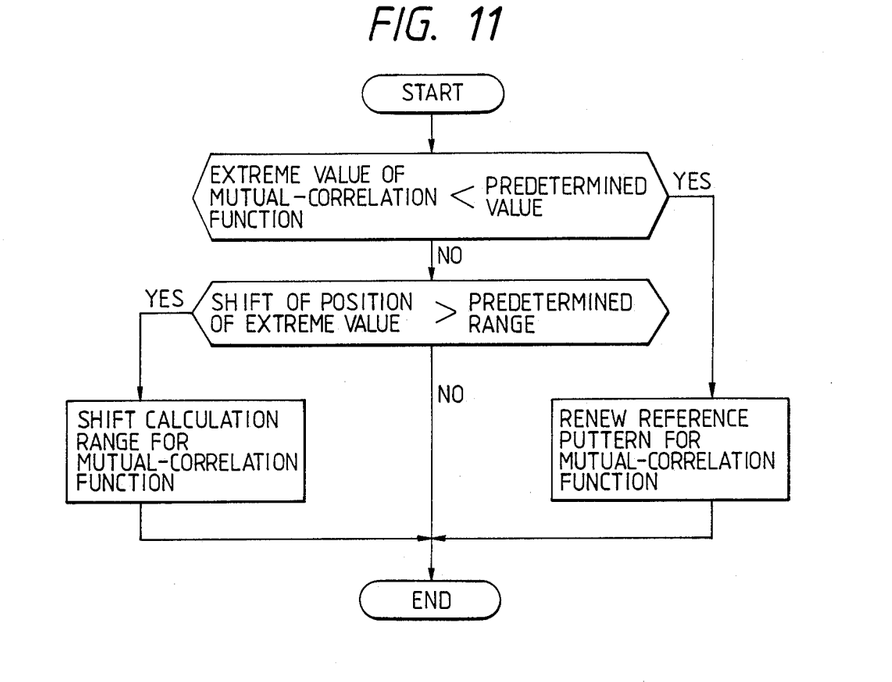
FIG. 11 is a flow chart for explaining the second embodiment of the deformation measuring method according to the invention.

As shown in a flow chart of FIG. 11, when the extreme value D becomes lower than the predetermined threshold value Dth, the reference pattern is automatically renewed and when the position E of the extreme value comes out of the predetermined range H, the correlation calculation range is automatically shifted.

As shown in FIG. 4, the shifts in the position of the extreme value detected by the correlators 40 and 42 are applied to and processed by the computer 44, and the amount of deformation of the object to be detected is calculated from the amount of displacement of the speckle pattern.

The computer 44 applies an instruction to the stepping motor controller 46 to move the linear stage 48 along the x-axis on which the object 10 is placed, thereby to displace the speckle pattern along the x-axis, and at the same time applies timing signals to the correlators 40 and 42.

In the above-described first and second embodiments, the photosensitive element arrays 20 and 24 comprising photosensitive elements are in the strip (comb) form and each photosensitive element has a rectangular form of a large ratio of a long side to a short side, that is, is in a strip of fancy paper, and further at least two of the photosensitive element arrays are provided. As a result, it is unnecessary to coincide the direction of displacement of the speckle pattern with the direction of the photosensitive element array, and the components in each of the directions can be measured.

The configuration of the photosensitive elements and the number of photosensitive element arrays are not limited only to those in the above-described embodiments. For instance, in the case where it is required to extract only the components of a speckle pattern along the x-axis, the number of photosensitive element arrays to be provided may be only one. In addition, the provision of more than two photosensitive element arrays will allow the measurement with high accuracy.

What is claimed is:

1. A deformation measuring method for detecting the amount of deformation of an object from displacement of a speckle pattern of the object, comprising the steps of:
    irradiating the object with a laser beam before and after deformation of the object to obtain speckle patterns;
    converting the speckle patterns into electrical signals; and
    calculating cross-correlation function between the speckle patterns from the electrical signals and obtaining the extreme value of the cross-correlation function by comparing a comparison speckle pattern data with a reference speckle pattern data for the cross-correlation function and renewing the reference speckle pattern data when the extreme value of the cross-correlation function is lower in level than a predetermined value.

2. A deformation measuring method as claimed in claim 1, wherein said renewed reference speckle pattern data comprises a speckle pattern data obtained by the just preceding scanning operation to the present scanning operation providing the comparison speckle pattern data.

3. A deformation measuring method as claimed in claim 1, further comprising the step of obtaining the amount of position shift of the extreme value of the cross-correlation function to determine the amount of the deformation of the object, and wherein said calculating step further comprises the step of renewing the reference speckle pattern data when the position of the extreme value of the cross-correlation function comes out of a predetermined range.

4. A deformation measuring method as claimed in claim 3, wherein said predetermined range has the minimum value corresponding to a half pitch interval of a photosensitive element array provided for performing said converting step.

5. A deformation measuring method as claimed in claim 1, further comprising the step of obtaining the amount of position shift of the extreme value of the cross-correlation function to determine the amount of the deformation of the object, and wherein said calculating step further comprises the step of shifting the calculation range for the cross-correlation function when the position of the extreme value of the cross-correlation function is out of a predetermined range.

6. A deformation measuring method as claimed in claim 5, wherein said shifting step comprises the step of shifting the calculation range at a positive side or a negative side thereof.

7. A deformation measuring device for detecting the amount of deformation of an object from displacement of a speckle pattern of the object, comprises:
    a light source for irradiating the object with a laser beam to obtain speckle patterns before and after deformation of the object;
    at least one photosensitive element array comprising plural photosensitive elements for converting the speckle patterns of the object into the corresponding electrical signals;
    at least one correlator for calculating the cross-correlation function between the speckle patterns from the electrical signals and obtaining the position of the extreme value of the cross-correlation function, said correlator comprising memory means for temporarily storing the preceding speckle pattern data, correlation calculating means for receiving a reference speckle pattern data from said memory and a comparison speckle pattern data from said photosensitive element array and outputting the correlation values between the reference and comparison speckle pattern data, a maximum value detecting circuit for outputting the extreme value of the correlation values, comparison means for comparing the level of the extreme value and the position thereof with a predetermined value and a predetermined range respectively and outputting an instruction signal for renewing the reference speckle pattern data when the extreme value is less in level than the predetermined value or when the position of the extreme value is out of the predetermined range, and a gate for renewing the reference speckle pattern data to the preceding speckle pattern data in response to the instruction signal;
    a microcomputer for obtaining the amount of shift in position of the extreme value of the cross-correlation function and determining the amount of deformation of the object from the amount of the shift.

8. A deformation measuring device as claimed in claim 7, wherein said photosensitive element array has a comb structure.

9. A deformation measuring device for detecting the amount of deformation of an object from displacement of a speckle pattern of the object, comprises:
    a light source for irradiating the object with a laser beam to obtain speckle patterns before and after deformation of the object;
    at least one photosensitive element array comprising plural photosensitive elements for converting the speckle patterns of the object into the correspondent electrical signals;
    at least one correlator for calculating the cross-correlation function between the speckle patterns from the electrical signals and obtaining the position of the extreme value of the cross-correlation function, said correlator comprising three shift registers for serving as a first shift register for holding the electrical signals as reference speckle pattern data, as a second shift register for holding the electrical signals as comparison speckle pattern data and a buffer shift register for holding the electrical signals during calculation of the cross-correlation function, said three shift registers being dynamically swapped in function for one another, a first multiplexer for receiving output signals from said shift registers and outputting one of the output signals as the reference speckle pattern data and a second multiplexer for receiving output signals from said shift registers and outputting one of the output signals as the comparison speckle pattern data, a correlation calculation circuit for receiving the reference and comparison speckle pattern data from said first and second multiplexers and calculating the cross-correlation function therebetween, a maximum value detecting circuit for obtaining the extreme value of the cross-correlation function and the position thereof, a first comparison circuit for comparing the extreme value with a predetermined value and outputting a first instruction signal for renewing the reference speckle pattern data when the extreme value is lower in level than the predetermined value, a second comparison circuit for comparing the position of the extreme value with a predetermined range and outputting a second instruction signal for shifting the cross-correlation range for calculation of the cross-correlation function when the position of the extreme value is out of the predetermined range, and a sequencer for exchanging the functions of said three shift registers for one another and changing the selected input terminals of said first and second multiplexers in response to said first and second instruction signals to thereby renew the reference speckle pattern data and shift the cross-correlation calculation range.

10. A deformation measuring device as claimed in claim 9, wherein said photosensitive element array has a comb structure.

* * * * *